United States Patent

Oh

(10) Patent No.: US 8,666,602 B2
(45) Date of Patent: Mar. 4, 2014

(54) METHOD OF PROTECTING MOTOR-DRIVEN POWER STEERING SYSTEM FROM OVERHEAT

(75) Inventor: Sewook Oh, Seoul (KR)

(73) Assignee: Hyundai Mobis Co., Ltd. (KR)

( * ) Notice: Subject to any disclaimer, the term of this patent is extended or adjusted under 35 U.S.C. 154(b) by 527 days.

(21) Appl. No.: 12/952,073

(22) Filed: Nov. 22, 2010

(65) Prior Publication Data

US 2011/0160965 A1   Jun. 30, 2011

(30) Foreign Application Priority Data

Dec. 31, 2009   (KR) ........................ 10-2009-0135093

(51) Int. Cl.
*B62D 5/04*   (2006.01)

(52) U.S. Cl.
USPC ........................................... 701/42; 180/446

(58) Field of Classification Search
USPC ........................................... 701/42; 180/446
See application file for complete search history.

(56) References Cited

U.S. PATENT DOCUMENTS

| 6,694,237 | B2 | 2/2004 | Kifuku et al. | |
|---|---|---|---|---|
| 2008/0217098 | A1* | 9/2008 | Takeuchi et al. | 180/446 |
| 2009/0200098 | A1* | 8/2009 | Inoue et al. | 180/446 |

FOREIGN PATENT DOCUMENTS

| JP | 2001-138929 A | 5/2001 |
|---|---|---|
| JP | 2003-072573 A | 3/2003 |
| JP | 2008-080967 A | 4/2008 |

\* cited by examiner

*Primary Examiner* — Mary Cheung
*Assistant Examiner* — Yuen Wong
(74) *Attorney, Agent, or Firm* — Knobbe Martens Olson & Bear LLP

(57) ABSTRACT

According a method of protecting a motor-driven power steering system from overheat, it is possible to prevent a steering motor and an ECU from being broken by overheat by controlling electric current supplied to the steering motor, by calculating an engine stop time from radiation temperature maps stored in a memory and changes in temperature of a temperature sensor when the engine having been stopped restarts without operating a specific protection logic when the engine stops, and calculating temperature of the steering motor and the ECU from the radiation temperature maps and the engine stop time.

15 Claims, 5 Drawing Sheets

METHOD OF PROTECTING MOTOR-DRIVEN POWER STEERING SYSTEM FROM OVERHEAT

CROSS-REFERENCE TO RELATED APPLICATIONS

The present application claims priority to Korean Patent Application Number 10-2009-0135093 filed Dec. 31, 2009, the entire contents of which application is incorporated herein for all purposes by this reference.

BACKGROUND

1. Field

The present disclosure relates to a method of protecting a motor-driven power steering system from overheat, in detail, a method of protecting a motor-driven power steering system from overheat that makes it possible to prevent a steering motor and an electronic controller from being broken by overheat.

2. Description of Related Art

In general, MDPS (Motor Driven Power Steering) systems operate a power-steering with a steering motor disposed at the lower end portion of the steering wheel shaft and operated when vehicles are started, without using a common method that operates a power steering by using oil circulated by operating a power pump.

In the motor-driven power steering systems, overload is applied to the steering motor and a field effect transistor (hereafter, referred to as "FET") of an electronic controller controlling the operation of the steering motor, when electric current applied to the steering motor is above allowable electric current, such that the steering motor and the electronic controller may be broken by overheat.

The information disclosed in this Background section is only for enhancement of understanding of the general background of the invention and should not be taken as an acknowledgement or any form of suggestion that this information forms the prior art already known to a person skilled in the art.

SUMMARY

Various aspects of the present invention are directed to provide a method of protecting a motor-driven power steering system from overheat that makes it possible to prevent a steering motor and an electronic controller from being broken by overheat, by calculating the accurate temperature of the steering motor and the electronic controller in starting the engine and limiting electric current supplied to the steering motor, via a radiation temperature map, when the engine is restarted after stopping.

Further, various aspects of the present invention are directed to provide a method of protecting a motor-driven power steering system from overheat which can prevent loss of power supplied to a system protection logic with the engine stopping, by stopping the system protection logic, when the engine stops.

An aspect of the present invention provides a method of protecting a motor-driven power steering system, the method including: determining whether an engine stops; storing stop sensor temperature of a temperature sensor, which is a temperature measured right before the engine stops, stop motor temperature of a steering motor and stop ECU temperature of an ECU controlling the operation of the steering motor, if determined that the engine stops; determining whether the engine restarts; measuring start sensor temperature by the temperature sensor, if determined that the engine restarts; calculating a stop time while the engine stops on the basis of the start sensor temperature and the stop sensor temperature, from a first temperature map storing changes in temperature of the temperature sensor according to a time change, by the ECU; and calculating start ECU temperature, which is temperature of the ECU when the engine starts, on the basis of a second temperature map storing changes in temperature of the ECU according to a time change and the stop time, by the ECU.

After calculating the stop time, the ECU calculates start motor temperature, which is temperature of the steering motor when the engine starts on the basis of a third temperature map storing changes in temperature of the steering wheel according to a time change and the stop time, when the ECU temperature is calculated.

After the start ECU temperature and the start motor temperature are calculated, when at least one of the start ECU temperature and the start motor temperature is more than critical temperature limiting the temperature of the steering motor and the ECU, the electric current supplied from the ECU to the steering motor may be limited.

When the engine does not stop and keeps operating, temperature of the ECU and the steering motor may be calculated from a system protection logic of the ECU supplied with power.

When the engine stops, the stop sensor temperature, the stop motor temperature, and the stop ECU temperature may be stored in a memory of the ECU.

The first temperature map, the second temperature map, and the third temperature map are stored in the memory of the ECU, and may be radiation temperature maps each storing changes in temperature of the temperature sensor, the steering motor, and the ECU, which refers to a degree of radiant heat in accordance with a time change after the engine stops.

The temperature of the ECU may be the temperature of a transistor controlling the operation of the steering motor.

According to a method of protecting a motor-driven power steering system from overheat, it is possible to estimate the accurate temperature of the steering motor and the electronic controller in starting the engine using a radiation temperature map and limiting electric current supplied to the steering motor, when the engine is restarted after stopping. Thus, it is possible to prevent a steering motor and an electronic controller from being broken by overheat.

Further, according to a method of protecting a motor-driven power steering system from overheat, it is possible to prevent loss of power supplied to a system protection logic by stopping the system protection logic when the engine stops.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF EMBODIMENTS

Figure 1:
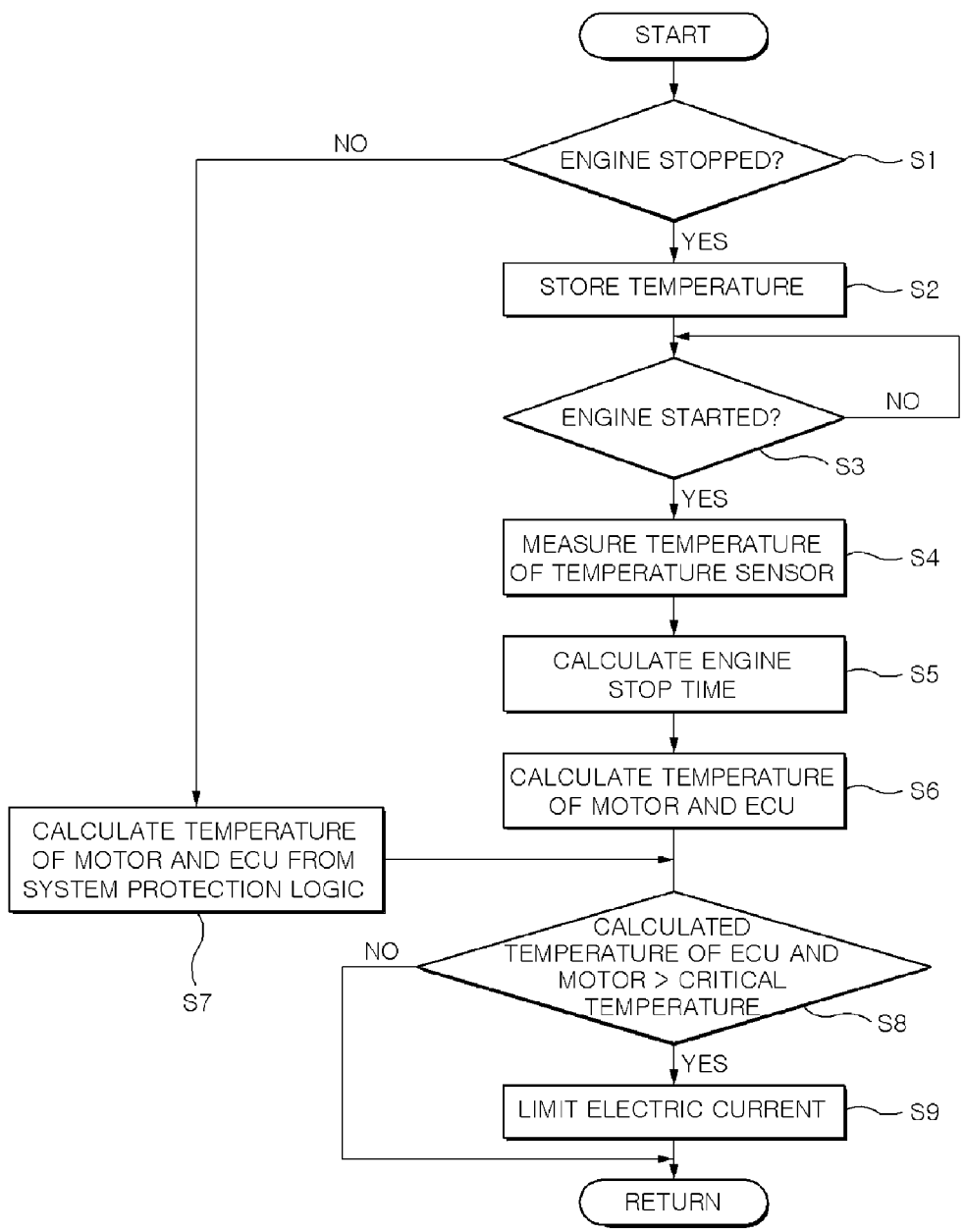
FIG. 1 is a flowchart illustrating a method of protecting a motor-driven power steering system from overheat according to an embodiment of the present invention.

Reference will now be made in detail to various embodiments of the present invention(s), examples of which are illustrated in the accompanying drawings and described below. While the invention(s) will be described in conjunction with embodiments, it will be understood that present description is not intended to limit the invention(s) to those embodiments. On the contrary, the invention(s) is/are intended to cover not only the embodiments, but also various alternatives, modifications, equivalents and other embodiments, which may be included within the spirit and scope of the invention as defined by the appended claims.

In one example, the motor-driven power steering systems estimate the temperature of the steering motor and the FET of the electronic controller by monitoring the temperature measured by a temperature sensor mounted in the electronic controller and the electric current applied to the steering motor, and control the electric current that is applied to the steering motor on the basis of the estimated results.

However, it is unable to monitor the temperature and electric current, because the power is cut when the engine stops; therefore, it is difficult to recognize the existing temperature when the engine is restarted. Accordingly, it is difficult to accurately estimate the temperature of the steering motor and the FET of the electronic controller.

In another example, when the engine stops, specific power is continuously supplied to the electronic controller such that the electric current applied to the temperature sensor and the steering motor can be monitored. Accordingly, it is possible to accurately estimate the temperature of the steering motor and the FET of the electronic controller. However, although the engine stops, the battery is discharged, because power should be continuously supplied to the electronic controller.

Embodiments of the present invention are described in detail as follows such that those skilled in the art can easily implement the present invention. The parts having similar configuration and operation are represented by the same reference numerals throughout the specification.

Figure 2:
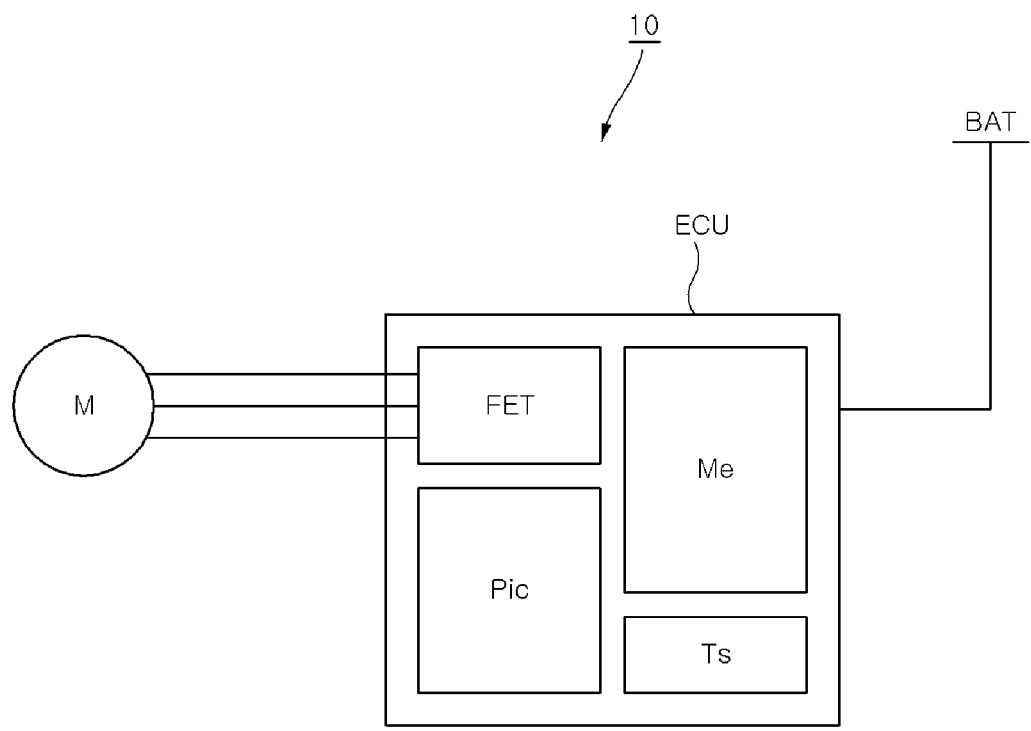
FIG. 2 is a block diagram illustrating a motor-driven power steering system according to an embodiment of the present invention.

FIG. 1 is a flowchart illustrating a method of protecting a motor-driven power steering system from overheat according to an embodiment of the present invention. FIG. 2 is a block diagram illustrating a motor-driven power steering system.

A steering motor M of a motor-driven power steering system 10 is operated by the torque generated when the driver turns the steering wheel. Driving steering motor M is controlled by switching a plurality of transistors FET, which is driving elements of an ECU (Electric Control Unit).

The transistors FET control the operation of steering motor M by applying or cutting battery voltage BAT to each coil of steering motor M.

A temperature sensor Ts measures sensor temperature that is the temperature of motor-driven power steering system 10. A system protection logic Pic calculates or estimates the temperature of steering motor M and the temperature of transistors FET of the electric control unit (hereafter, referred to as "ECU temperature"). The ECU controls steering motor M on the basis of the sensor temperature measured by temperature sensor Ts and the electric current measured from steering motor M.

When the estimated temperature of steering motor M and the estimated ECU temperature are higher than critical temperature, the ECU operates to limit the electric current applied to the steering motor M. System protection logic Pic is operated by the battery power BAT only when the engine of the vehicle is in operation. Thus, the ECU prevents the steering motor M and the FET from being broken by overheat due to overload applied to steering motor M and the FET.

Figure 3:
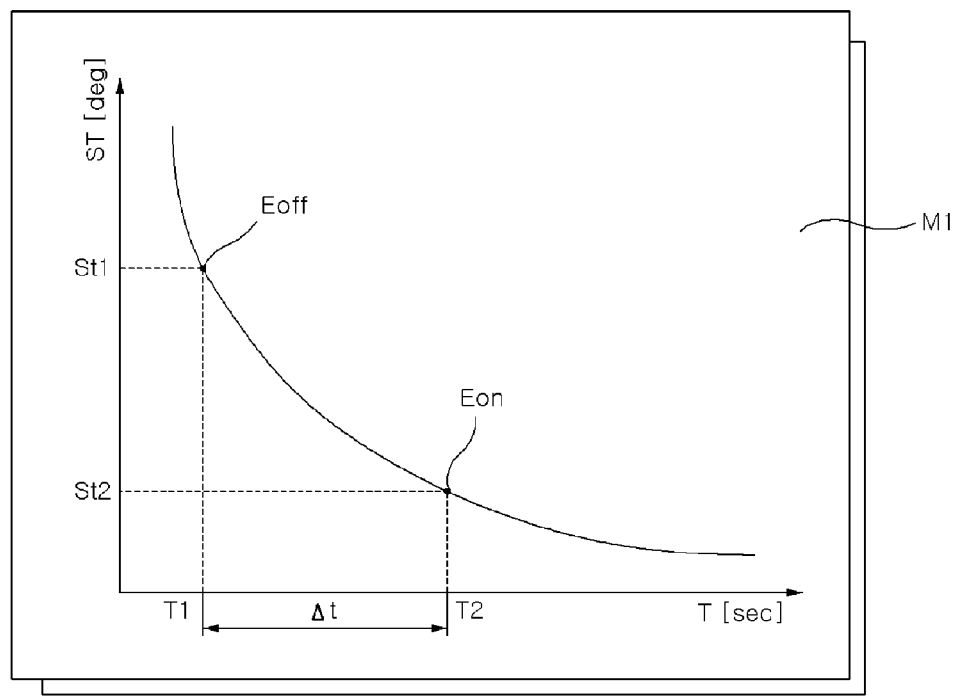
FIG. 3 is a first temperature map storing changes in temperature to time of the temperature sensor shown in FIG. 1.

A memory Me stores a first temperature map M1 of FIG. 3 storing changes in radiation temperature of motor-driven power steering system 10 while the engine stops. The memory Me further stores a second temperature map M2 of FIG. 4 storing changes in radiation temperature of the ECU while the engine stops, and a third temperature map M3 storing changes in radiation temperature of steering motor M while the engine stops.

Further, memory Me stores the sensor temperature measured by temperature sensor Ts, the calculated temperature of steering motor M, and the calculated ECU temperature. Therefore, when the engine stops, memory Me stores the stop sensor temperature which are measured right before the engine stops, the stop motor temperature, and the stop ECU temperature.

A method of protecting the motor-driven power steering system 10 from overheat calculates the temperature of steering motor M and the ECU from radiation temperature maps M1, M2, and M3 stored in memory Me, when the engine stops, and calculates the temperature of steering motor M and the ECU from system protection logic Pic, when the engine is in operation.

Therefore, it is first determined whether the engine stops or not in order to perform the method of protecting motor-driven power steering system 10 from overheat (S1).

If the engine does not stop, it is determined that the engine keeps operating, such that battery power BAT keeps being supplied to the ECU and the temperature of steering motor M and the is calculated from system protection logic Pic of the ECU (S7).

Further, when it is determined that the engine stops, an integral controller (not shown) prevents battery power BAT from being supplied to the ECU to prevent loss of power which is generated when the engine stops. Accordingly, system protection logic Pic of the ECU stops operating.

In some embodiments, as described above, when system protection logic Pic stops operating, the temperature is stored in memory Me to calculate the temperature of steering motor M and the ECU from first temperature map M1, second temperature map M2, and third temperature map M3.

In this process of storing temperature, the ECU operates to store the stop sensor temperature measured right before the engine stops by temperature sensor Ts and the stop motor temperature of steering motor M and the stop ECU temperature of the ECU which are calculated by system protection logic Pic, into memory M3 of the ECU (S2).

Further, after the temperature is stored in memory Me, it is determined whether the engine restarts (S3). When the engine does not start again, memory Me of the ECU keeps storing the stop temperature stored in the step of storing temperature (S2).

Further, when the engine restarts, temperature sensor Ts of the ECU measures start sensor temperature of motor-driven power steering system 100 (S4).

Further, the ECU calculates how long the engine stops, that is, the engine stop time on the basis of the start sensor temperature measured by temperature sensor Ts and the stop sensor temperature stored in memory Me when the engine stops (S5).

For example, assuming that the stop sensor temperature is St1 and the start sensor temperature is St2, the time difference obtained by subtracting a first time point T1 corresponding to stop sensor temperature St1 from a second time point T2 corresponding to start sensor temperature St2 in first temperature map M1 of FIG. 3 is calculated as the engine stop time Δt, how long the engine keeps stopping.

Further, the ECU calculates start ECU temperature that is temperature of the ECU when the engine restarts, on the basis of the calculated engine stop time Δt and second temperature map M2 (S6).

Figure 4:
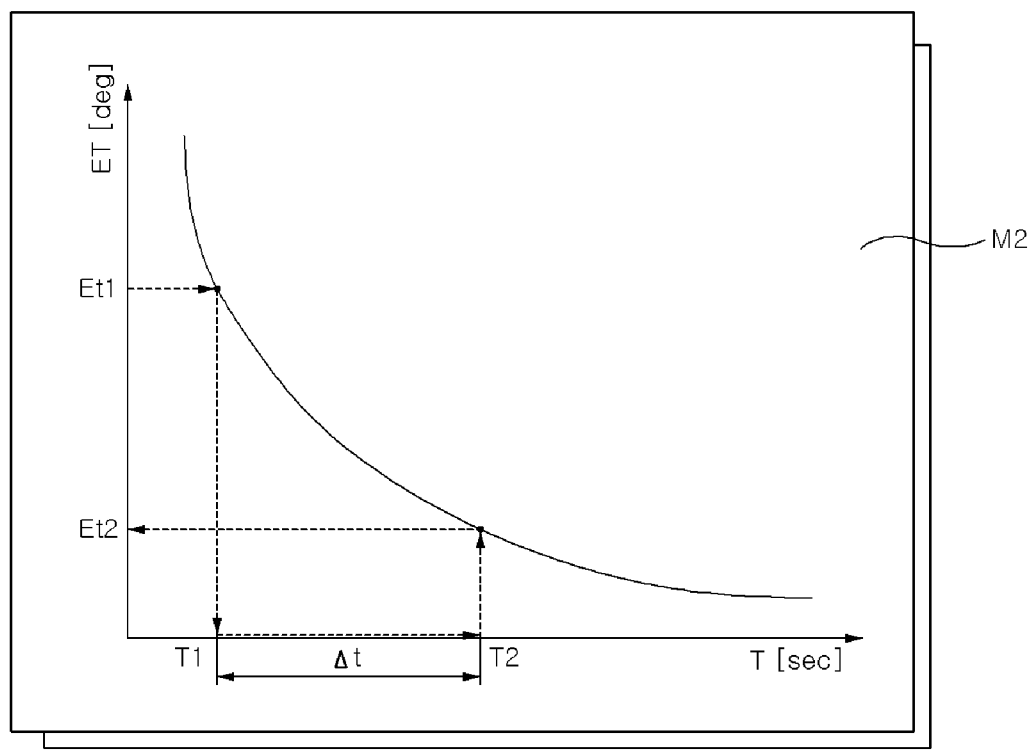
FIG. 4 is a first temperature map storing changes in temperature to time of the steering motor shown in FIG. 1.

For example, when the stop ECU temperature is Et1, the temperature Et2 of a second time point T2 when time passes by engine stop time Δt from a first time point corresponding the stop ECU temperature Et1 in second temperature map M2 of FIG. 4 is calculated as start ECU temperature Et2.

Further, the ECU calculates start motor temperature that is temperature of steering motor when the engine restarts, on the basis of the engine stop time Δt calculated by the ECU and third temperature map M3 (S6).

Figure 5:
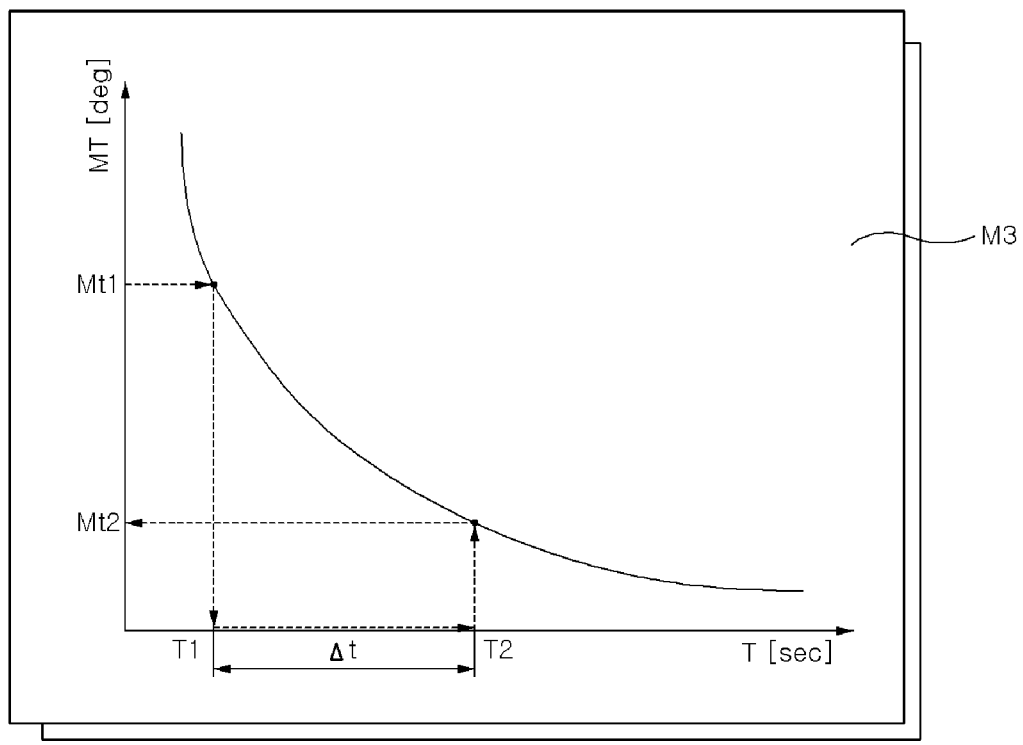
FIG. 5 is a first temperature map storing changes in temperature to time of the electronic controller shown in FIG. 1.

For example, when the stop motor temperature is Mt1, the temperature Mt2 of a second time point T2 when time passes by engine stop time Δt from a first time point T1 corresponding the stop motor temperature Mt1 in third temperature map of FIG. 5 is calculated as start motor temperature Mt2.

That is, when the engine that has stopped restarts, the ECU calculates start motor temperature Mt2 that is temperature of steering motor and start ECU temperature Et2 that is temperature of the ECU when the engine starts, on the basis of the temperature of motor-driven power steering system 10 which is measured by temperature sensor Ts when the engine starts, and first temperature map M1, second temperature map M2, and third temperature map M3 stored in memory Me.

Further, the ECU determines whether at least one of the calculated start ECU temperature ET2 and start motor temperature Mt2 is higher than critical temperature (S8). The critical temperature is temperature to determine whether steering motor M and the ECU are overheated. When at least one of the temperatures of the ECU and steering motor M becomes larger than the critical temperature, the ECU and steering motor M may be broken by overheat.

Further, even though the engine keeps operating and the temperature of the ECU and steering motor M is calculated from system protection logic Pic, the ECU determines whether at least one of the calculated temperature of steering motor M and the ECU is higher than the critical temperature (S8).

Further, when at least one of start motor temperature Mt2 and start ECU temperature Et2 is more than the critical temperature, steering motor M or the ECU could be overheated; therefore, to prevent the overheat, the electric current supplied to steering motor M is limited (S9) such that steering motor M and the ECU are prevented from being broken by overheat due to overload.

Further, when all of start motor temperature Mt2 and start ECU temperature Et2 is less than the critical temperature, it is determined that steering motor M and the ECU are not overloaded, such that the electric current supplied to steering motor M is not specifically controlled.

The method of protecting a motor-driven power steering system from overheat can prevent loss of power supplied to system protection logic Pic with the engine stopping, by stop system protection logic Pic, when the engine stops.

Further, the method of protecting a motor-driven power steering system from overheat includes storing the temperature of steering motor M, the ECU, and temperature sensor Ts into the ECU when the engine stops. The method further includes calculating temperature of steering motor M and the ECU when the engine restarts using the temperature measured by temperature sensor Ts and first temperature map M1, second temperature map M2, and third temperature map M3 stored in the ECU.

That is, since the method of protection a motor-driven power steering system from overheat calculates changes in temperature of steering motor M and the ECU for the time the engine keeps stopping, from radiation temperature map M1, M2, and M3 stored in the memory, without operating a specific protection logic, when the engine having been stopped restarts, it is possible to prevent steering motor M and the ECU from being broken by overheat.

The embodiment described above is nothing but one example for illustrating a method of protection a motor-driven power steering system of the present invention, the present invention is not limited thereto and it should be understood that the scope of the present invention includes various modifications by those skilled in the art without departing from the spirit of the present invention, as described in the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to explain certain principles of the invention and their practical application, to thereby enable others skilled in the art to make and utilize various embodiments of the present invention, as well as various alternatives and modifications thereof. It is intended that the scope of the invention be defined by the Claims appended hereto and their equivalents.

What is claimed is:

1. A method of operating a motor-driven power steering system of a vehicle, the method comprising:

providing a vehicle comprising an engine and a motor-driven power steering system, the motor-driven power steering system comprising a steering motor, a control circuit, and a temperature sensor located at a sensor location other than on the steering motor, the temperature sensor being configured to measure sensor temperature at the sensor location during operation of the vehicle, the control circuit being configured to estimate motor temperature of the steering motor based on the measured sensor temperature and electric current supplied to the steering motor, wherein the sensor temperature at a first stoppage of the engine is defined as a first sensor temperature, wherein the electric current at the first stoppage of the engine is defined as a first electric current;

providing a first temperature map indicative of changes in the sensor temperature over time after stoppage of the engine;

providing a second temperature map indicative of temperature changes of the steering motor over time after stoppage of the engine;

storing the first sensor temperature;

estimating a first motor temperature using the first sensor temperature and the first electric current;

upon start of the engine that is immediately after the first stoppage, measuring a second sensor temperature at the sensor location using the temperature sensor;

estimating a time length between the first stoppage of the engine and the start of the engine using the first sensor temperature, the second sensor temperature and the first temperature map;

estimating a second motor temperature of the steering motor using the estimated time length, the first motor temperature and the second temperature map; and controlling an electric power supplied to the steering motor based on the second motor temperature.

2. The method of claim 1, wherein controlling comprises limiting the electric power to the steering motor when the second motor temperature is greater than a predetermined temperature.

3. The method of claim 1, wherein the control circuit comprises a memory which stores the first temperature map.

4. The method of claim 3, wherein the memory further stores the second temperature map.

5. The method of claim 1, further comprising:

estimating a first FET temperature of a field effect transistor (FET) of the control circuit using the first sensor temperature and the first electric current; and estimating a second FET temperature of the FET using the estimated time length and the first FET temperature, wherein the electric power is controlled further based on the second FET temperature.

6. The method of claim 5, wherein controlling comprises limiting the electric power to the steering motor when the second FET temperature is greater than a predetermined temperature.

7. The method of claim 5, wherein the control circuit comprises a memory which stores the first and second temperature maps, and a third temperature map representing relationship between the engine stopping time length and the temperature of the FET.

8. The method of claim 5, wherein the steering motor and the FET are spaced from the sensor location.

9. A method of operating a motor-driven power steering system of a vehicle, the method comprising:

determining whether an engine has stopped;

storing a stop sensor temperature of a temperature sensor, which is a temperature measured right before the engine stops, a stop motor temperature of a steering motor and a stop ECU temperature of an ECU controlling the operation of the steering motor, if determined that the engine has stopped;

determining whether the engine has restarted;

measuring a start sensor temperature by the temperature sensor, if determined that the engine has restarted;

estimating a stop time while the engine stops on the basis of the start sensor temperature and the stop sensor temperature using a first temperature map indicative of changes in the sensor temperature over time after stoppage of the engine; and estimating a start ECU temperature, which is temperature of the ECU when the engine starts, using the stop ECU temperature, a second temperature map indicative of temperature changes of the ECU over time after stoppage of the engine and the stop time.

10. The method of claim 9, wherein after estimating the stop time, the ECU calculates a start motor temperature, which is temperature of the steering motor when the engine starts, on the basis of the stop motor temperature, a third temperature map indicative of temperature changes of the steering motor over time after stoppage of the engine and the stop time.

11. The method of claim 10, wherein after the start ECU temperature and the start motor temperature are estimated, when at least one of the start ECU temperature and the start motor temperature is more than a predetermined temperature, the electric current supplied from the ECU to the steering motor is limited.

12. The method of claim 10, wherein the first temperature map, the second temperature map, and the third temperature map are stored in a memory of the ECU.

13. The method of claim 9, wherein when the engine does not stop and keeps operating, temperatures of the ECU and the steering motor are estimated using a system protection logic of the ECU.

14. The method of claim 9, wherein when the engine stops, the stop sensor temperature, the stop motor temperature, and the stop ECU temperature are stored in a memory of the ECU.

15. The method of claim 9, wherein the estimated start and stop temperatures of the ECU are temperatures estimated at a transistor controlling the operation of the steering motor.

* * * * *